(12) United States Patent
Baptist et al.

(10) Patent No.: US 11,550,501 B2
(45) Date of Patent: Jan. 10, 2023

(54) STORING DATA SEQUENTIALLY IN ZONES IN A DISPERSED STORAGE NETWORK (71) Applicant: INTERNATIONAL BUSINESS MACHINES CORPORATION, Armonk, NY (US)

(72) Inventors: Andrew D. Baptist, Racine, WI (US); Manish Motwani, Chicago, IL (US); Praveen Viraraghavan, Chicago, IL (US); Ilya Volvovski, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/833,788

(22) Filed: Mar. 30, 2020

(65) Prior Publication Data
US 2020/0225881 A1 Jul. 16, 2020

Related U.S. Application Data

(63) Continuation of application No. 15/444,800, filed on Feb. 28, 2017, now Pat. No. 10,642,532.

(51) Int. Cl.
*G06F 3/06* (2006.01)
*G06F 11/10* (2006.01)

(52) U.S. Cl.
CPC ............ *G06F 3/0659* (2013.01); *G06F 3/061* (2013.01); *G06F 3/064* (2013.01); *G06F 3/067* (2013.01);
(Continued)

(58) Field of Classification Search
CPC ............... G06F 11/1076; G06F 11/108; G06F 3/0619; G06F 3/061; G06F 3/0635;
(Continued)

(56) References Cited

U.S. PATENT DOCUMENTS 4,092,732 A 5/1978 Ouchi
5,416,808 A 5/1995 Witsaman et al.
(Continued)

FOREIGN PATENT DOCUMENTS

CN 105893135 8/2016
JP 2001100927 4/2001
(Continued)

OTHER PUBLICATIONS

Shamir; How to Share a Secret; Communications of the ACM; vol. 22, No. 11; Nov. 1979; pp. 612-613.
(Continued)

*Primary Examiner* — Gautam Sain
*Assistant Examiner* — Edward Waddy, Jr.
(74) *Attorney, Agent, or Firm* — Randy Emilio Tejeda; Andrew D. Wright; Calderon Safran & Cole, P.C.

(57) ABSTRACT

A method for execution by a storage unit in a dispersed storage network (DSN) includes selecting a storage zone of a memory device of the storage unit based on zone allocation parameters, and designating the selected storage zone as open for writes. A data slice is received via a network for storage. The data slice is written sequentially at a memory location of the one of storage zone based on determining that the storage zone is designated as open for writes. A pointer corresponding to the data slice that indicates the storage zone and the memory location is generated. A read request is received via the network from a requesting entity that indicates the data slice. The data slice is retrieved from the memory device based on the pointer, and is transmitted to the requesting entity.

20 Claims, 6 Drawing Sheets

(52) U.S. Cl.
CPC .......... *G06F 3/0619* (2013.01); *G06F 3/0635* (2013.01); *G06F 11/108* (2013.01); *G06F 11/1076* (2013.01)

(58) Field of Classification Search
CPC ........ G06F 3/064; G06F 3/067; G06F 3/0659; G06F 3/0604; G06F 3/0644
USPC ................. 711/154, 170, 173, E12.001, 103
See application file for complete search history.

(56) References Cited

U.S. PATENT DOCUMENTS

| | | |
|---|---|---|
| 5,454,101 A | 9/1995 | Mackay et al. |
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,212,512 B1* | 4/2001 | Barney ............... G06F 11/1435 707/999.009 |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 8,261,033 B1 | 9/2012 | Slik et al. |
| 8,458,424 B2 | 6/2013 | Sudo et al. |
| 8,856,483 B1* | 10/2014 | Paterson-Jones ..... G06F 3/0608 711/170 |
| 8,909,858 B2 | 12/2014 | Resch et al. |
| 9,135,030 B2* | 9/2015 | Metsapelto .......... G06F 9/44526 |
| 10,296,881 B2* | 5/2019 | Yan ..................... G06Q 20/123 |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0056073 A1 | 3/2003 | Zeiger |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma et al. |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula, Jr. |
| 2005/0132070 A1 | 6/2005 | Redlich et al. |
| 2005/0144382 A1 | 6/2005 | Schmisseur |
| 2005/0229069 A1 | 10/2005 | Hassner |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll, Jr. |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters, III et al. |
| 2009/0094251 A1 | 4/2009 | Gladwin et al. |
| 2009/0094318 A1 | 4/2009 | Gladwin et al. |
| 2010/0017559 A1* | 1/2010 | Fruin ..................... G06F 3/0679 711/170 |
| 2010/0023524 A1 | 1/2010 | Gladwin et al. |
| 2010/0306524 A1* | 12/2010 | Runkis ..................... H04L 9/065 713/150 |
| 2012/0166757 A1 | 6/2012 | Volvovski |
| 2013/0138706 A1 | 5/2013 | Dhuse et al. |
| 2014/0019680 A1 | 1/2014 | Jin et al. |
| 2014/0181414 A1* | 6/2014 | Eckert ................. G06F 12/0897 711/135 |
| 2015/0032965 A1* | 1/2015 | Sugimoto ........... G06F 12/0868 711/129 |
| 2015/0143053 A1* | 5/2015 | Quimbey ............ G06F 12/0888 711/133 |
| 2015/0317176 A1* | 11/2015 | Hussain .................. H04L 67/10 718/1 |
| 2015/0363126 A1* | 12/2015 | Frick ......................... G06F 1/28 711/114 |
| 2016/0041774 A1 | 2/2016 | Sharifie et al. |
| 2016/0371202 A1 | 12/2016 | Dhuse |
| 2017/0235512 A1* | 8/2017 | Ruchita ................... G06F 16/13 711/170 |
| 2018/0246670 A1 | 8/2018 | Baptist et al. |

FOREIGN PATENT DOCUMENTS

| | | |
|---|---|---|
| JP | 2012529086 | 11/2012 |
| JP | 2017518565 | 7/2017 |
| WO | 2010138898 | 12/2010 |
| WO | 2015167665 | 11/2015 |

OTHER PUBLICATIONS

Rabin; Efficient Dispersal of Information for Security, Load Balancing, and Fault Tolerance; Journal of the Association or Computer Machinery; vol. 36, No. 2; Apr. 1989; pp. 335-348.

Chung; An Automatic Data Segmentation Method for 30 Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group RFC 4516; Jun. 2006; pp. 1-15.

(56) References Cited

OTHER PUBLICATIONS

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium an High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

International Searching Authority; International Search Report and Written Opinion; International Application No. PCT/182018/051051; dated May 29, 2018; 9 pgs.

List of IBM Patents or Patent Applications Treated as Related, dated Mar. 30, 2020, 1 page.

Japanese Office Action and Search Report issued in Application No. 2019-545947 dated Sep. 21, 2021, 2 pages.

Chinese Office Action issued in Application No. 201880011510.5 dated Sep. 5, 2022, 16 pages.

\* cited by examiner

STORING DATA SEQUENTIALLY IN ZONES IN A DISPERSED STORAGE NETWORK

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

DETAILED DESCRIPTION OF THE INVENTION

Figure 1:
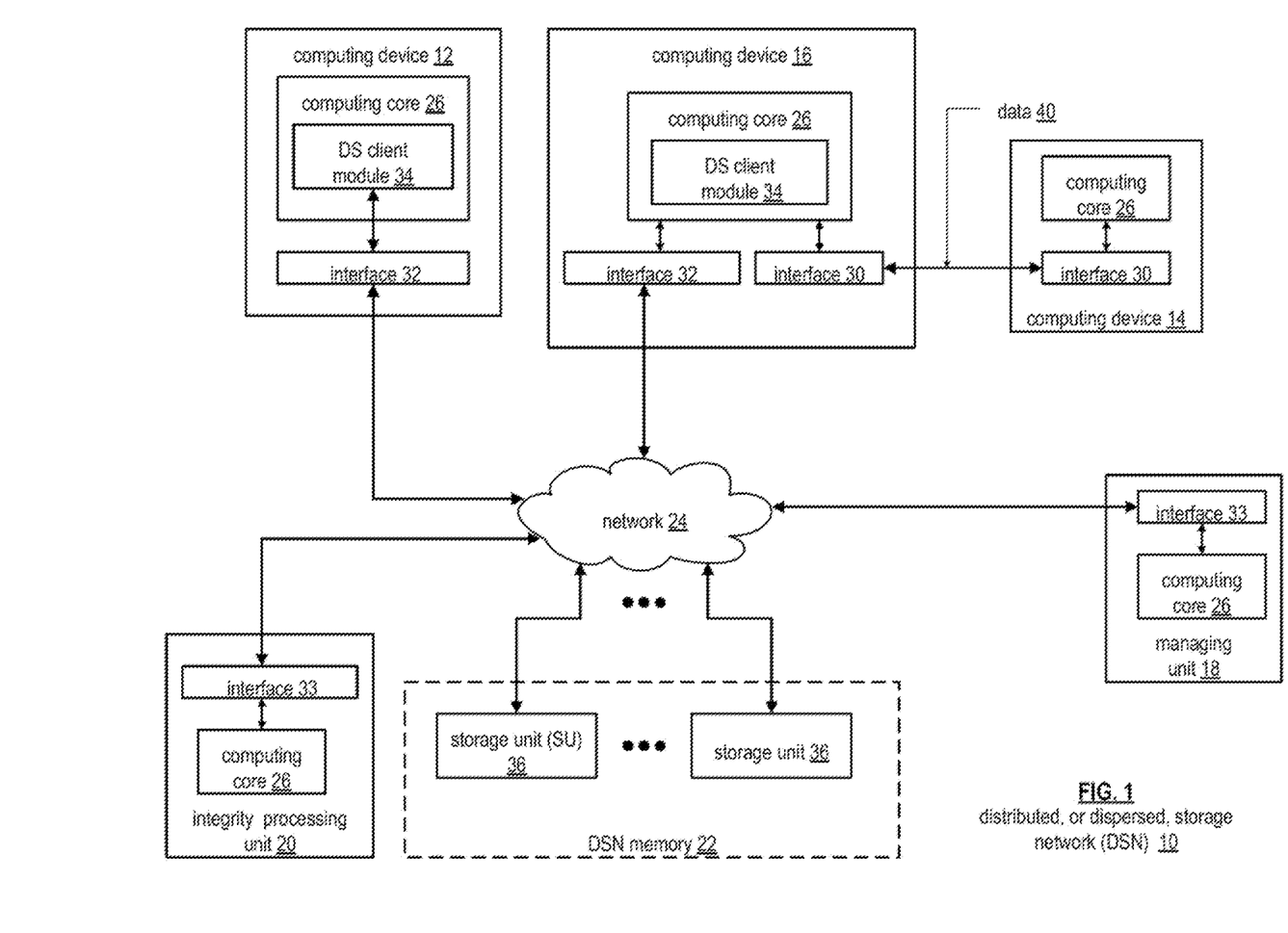
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
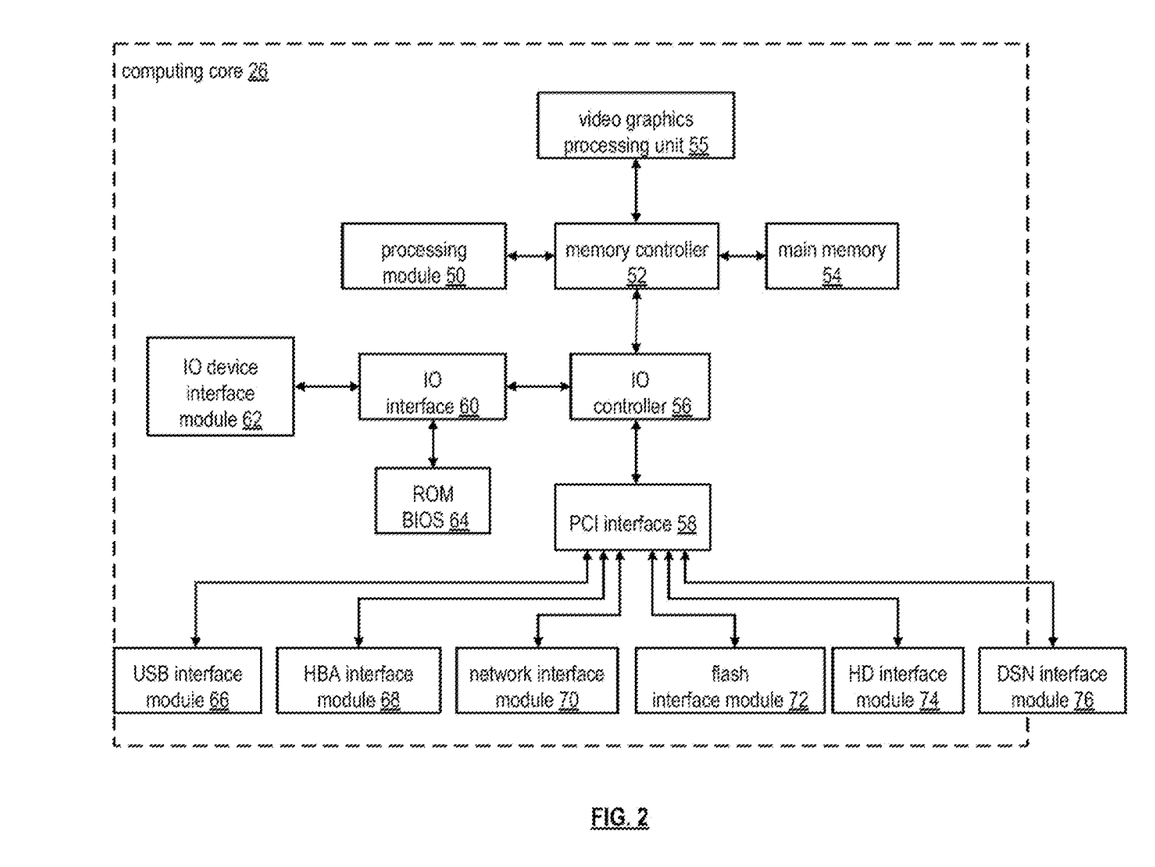
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

In various embodiments, each of the storage units operates as a distributed storage and task (DST) execution unit, and is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. Hereafter, a storage unit may be interchangeably referred to as a dispersed storage and task (DST) execution unit and a set of storage units may be interchangeably referred to as a set of DST execution units.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each managing unit 18 and the integrity processing unit 20 may be separate computing devices, may be a common computing device, and/or may be integrated into one or more of the computing devices 12-16 and/or into one or more of the storage units 36. In various embodiments, computing devices 12-16 can include user devices and/or can be utilized by a requesting entity generating access requests, which can include requests to read or write data to storage units in the DSN.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (TO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

Figures 3, 4:
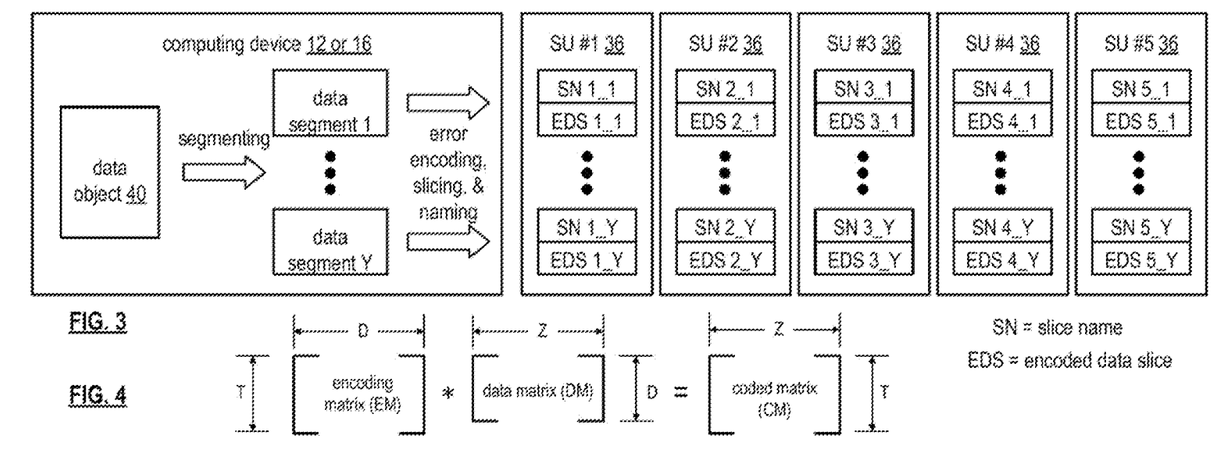
FIG. 3 is a schematic block diagram of an example of dispersed storage error encoding of data in accordance with the present invention.
FIG. 4 is a schematic block diagram of a generic example of an error encoding function in accordance with the present invention.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. Here, the computing device stores data object 40, which can include a file (e.g., text, video, audio, etc.), or other data arrangement. The dispersed storage error encoding parameters include an encoding function (e.g., information dispersal algorithm (IDA), Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

Figures 5, 6:
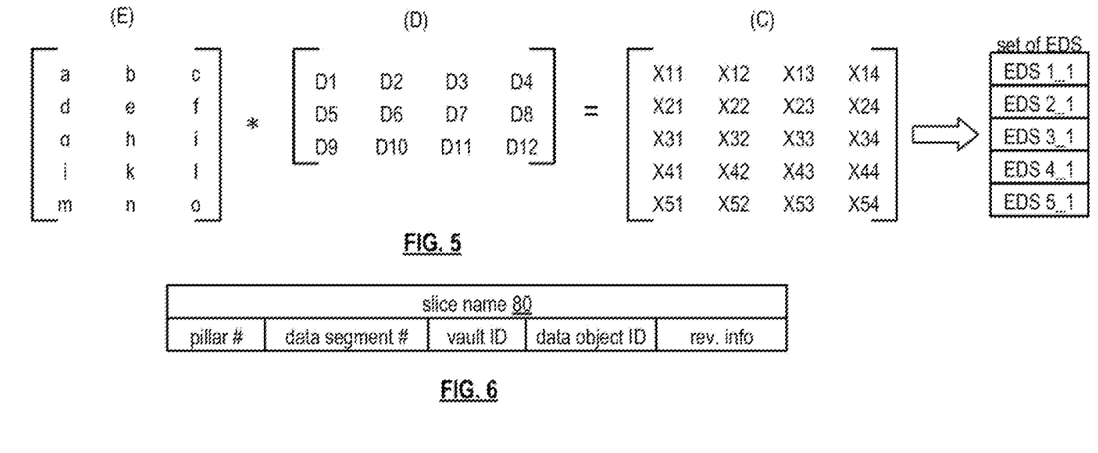
FIG. 5 is a schematic block diagram of a specific example of an error encoding function in accordance with the present invention.
FIG. 6 is a schematic block diagram of an example of a slice name of an encoded data slice (EDS) in accordance with the present invention.

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides data object 40 into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
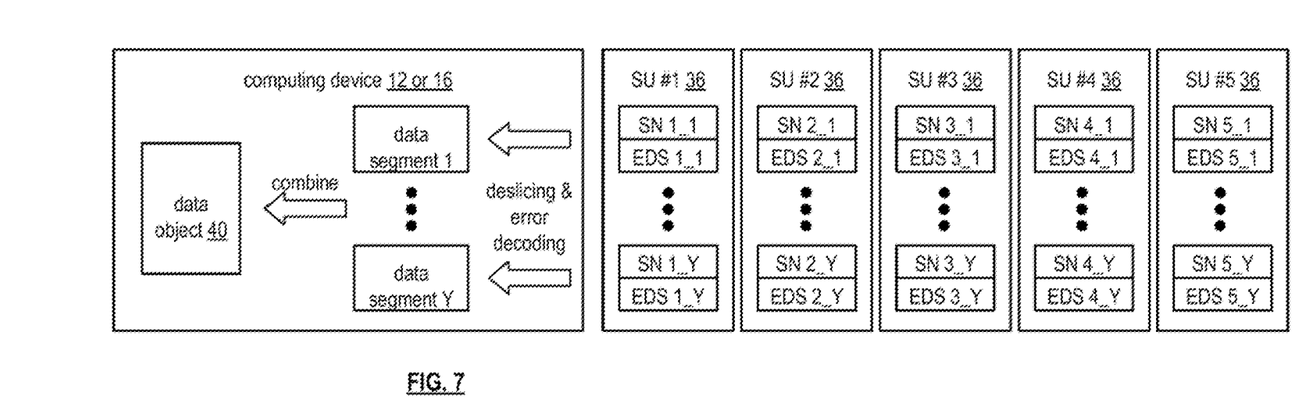
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
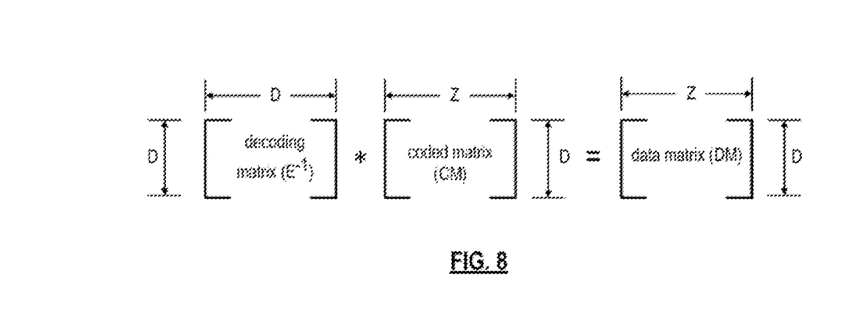
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
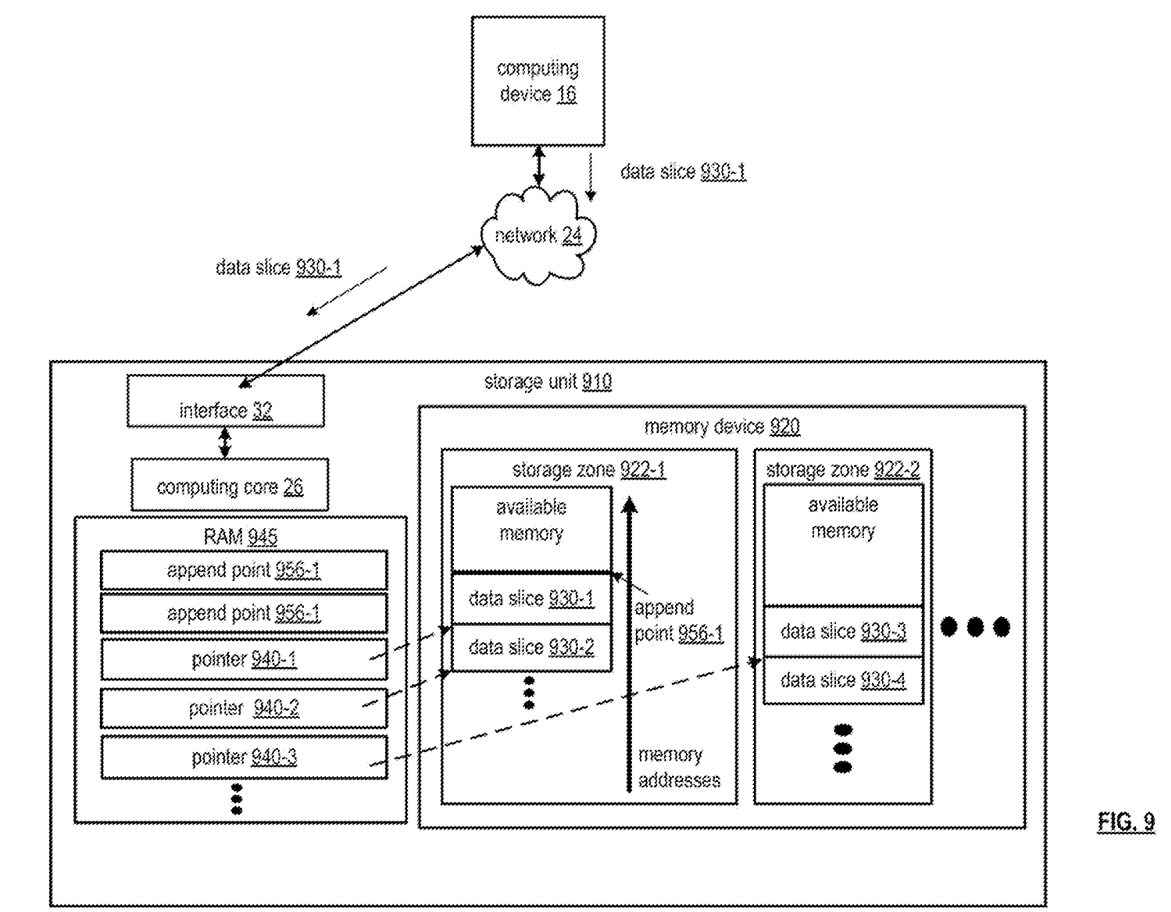
FIG. 9 is a schematic block diagram of an embodiment of a dispersed or distributed storage network (DSN) in accordance with the present invention.

FIG. 9 is a schematic block diagram of another embodiment of a dispersed storage network (DSN) that includes a computing device 16 of FIG. 1, the network 24 of FIG. 1, and at least one storage unit 910. The storage unit 910 can include the interface 32 of FIG. 1 and the computing core 26 of FIG. 1, and can be implemented by utilizing the storage unit 36 of FIG. 1. The storage unit 910 can include one or more memory devices 920, and each memory device 920 can be divided into a plurality of storage zones, including storage zones 922-1 and 922-2. Each storage zone can include a subset of data objects, data segments, and/or data slices stored by the memory device 920, which can include data slices 930-1, 930-2, 930-3, and 930-4. The storage unit can also include a RAM 945, which can include a volatile memory or other memory, and which can be implemented by utilizing computing core 26. The RAM 945 can include a plurality of append points, including append point 956-1 and append point 956-2, where the plurality of append points correspond to memory locations of the plurality of storage zones where the next data should be stored according to a sequential or append only write protocol. The RAM 945 can also include a plurality of pointers corresponding to data slices stored in the storage unit that include memory locations, offset information, zone information, and/or memory device information such that the corresponding data slice can be fetched from memory by utilizing its corresponding pointer. The DSN functions to store data sequentially in zones.

A major component of request latency on a DSN is the time storage units spend reading data from and writing data to memory devices. Generally, a large portion of the time a memory device spends reading or writing data is seeking to the track and sector where the requested data is located. One way to fully control memory device seeking is to bypass formatting memory devices of storage units with a filesystem and instead read and write directly on the raw memory device over supported protocols, for example, by utilizing the Small Computer System Interface (SCSI) protocol or other protocol that supports writing directly to raw memory. To support sequential writes and/or data removal, one or more memory devices 920 of a storage unit can be split into fixed-sized zones, where the storage unit utilizes a fully sequential write protocol. For example, a storage unit can be implemented by utilizing Append Optimal Storage Devices (AOSD) or other memory devices for which appended writes are the optimal form of access, and/or for which an append-only write scheme is utilized when storing data. The append-only write scheme dictates that new data objects and/or slices are written by being appended to an end, or "append point" of a zone in storage, such as storage zone 922-1 and 922-2. As data slices are written, they are written to the next space in their respective zone of memory according to the corresponding append point of the zone, and the append point is updated based on the length of newly written data, such as data slices 930-1-930-4. Append points for each zone, such as append points 956-1 and 956-2, can be maintained in a volatile memory such as RAM 945 or other memory of the storage unit, and can be stored as a pointer or other reference to the append point location of the memory device.

The storage unit can dynamically allocate new zones and un-allocate old zones of one or more memory devices to maintain a fixed number of active zones and/or a number of active zones that is determined to be optimal. The number of zones and/or the zones selected in the subset can be determined based on zone allocation parameters and/or zone reallocation parameters, which can be based on I/O request frequency, memory and/or processing requirements, I/O speed requirements, and/or other zone allocation and/or reallocation requirements. Selecting a smaller subset of zones open for write can further minimize seeking and thus improve I/O speed. In some embodiments, exactly one zone per memory device is open for writing at any given time. This can eliminates seeking on each memory device as writing is fully sequential on each memory device. In various embodiments, the active zone can be selected based on available space in the zone, based on a previously selected zone, and/or selected randomly. The storage unit can maintain information regarding which zones are designated as open to writes and/or reads, and which zones are closed to writes and/or reads, and can change these designations in response to determining a reallocation requirement is met. The storage unit can also maintain zone priority information and/or available capacity information for each of the zones. This information can be stored in RAM 945 or other memory of the storage unit.

In a purely write-based workload on a DSN, the aforementioned enhancements can reduce memory device seeking to a single time when a new zone is allocated and no further seeking will be required until a new zone needs to be allocated. There are also enhancements that can be employed with regard to reading data from memory devices. This can include maintaining pointers, such as pointers 940-1-940-3, for all data that describe exactly where on the memory device any requested data is stored, thereby reducing to a single seek for reading the data. Such pointers can be stored on a faster memory, such as a RAM 945 or other memory of the storage device. The pointers can include information about the memory device, zone, file, offset, and/or length of the data slice.

Another strategy used by storage units to facilitate faster reads includes caching reads intelligently in faster volatile memory such as RAM 945, for example on a frequency-based policy where data that is used frequently stays in the volatile memory. The read frequency of a data slice can be received from a computing device 16 or other entity via the network, for example as a priority indicator when the data is first written or later based on a change in data priority. The storage unit can also track read frequency of data slices, and can determine to move a data slice to the volatile memory when the read frequency, for example, a number of reads in a fixed time period, exceeds or otherwise compares favorably to a predefined read frequency threshold.

Another strategy used by storage units to minimize the time spent seeking during I/O includes caching incoming reads and/or writes in faster volatile memory, such as RAM 945, and/or writing larger amounts of data sequentially in batches to the persistent memory device and/or zone. Flushing data from the cache may be done on a periodic basis, for example every one second, at another fixed time interval, in response to receiving a flush requirement, and/or if the usage of the volatile memory is approaching, exceeds, or otherwise compares unfavorably to a predefined threshold. Flushing the data can include generating a large data object that includes the plurality of data slices, where the data slices are organized within the large data object based on a protocol that may or may not be sequential. The large data object is written sequentially to the persistent memory device and/or zone.

Caching incoming reads and/or writes can also be used to minimize the number and frequencies of switching between zones. While writing to one zone in a memory device, writes of new data destined for one or more other zones can be queued in one or more corresponding caches, for example, stored in RAM 945. The storage unit can queue data based on time received or other data priority requirements. The storage unit can determine which zone data is queued for based on data dependency, the size of the data, the available space in the other zones, namespace and/or mapping requirements, or other location requirements that dictate if certain data must be stored in a certain zone. In various embodiments, some or all data is queued up randomly. A storage unit can determines it is optimal to switch zones and/or select the new zone in response to cache capacity approaching, exceeding, or otherwise comparing unfavorably to a predefined cache capacity threshold. A storage unit can switch to a new zone based on data timing and/or data dependency requirements, for example, by determining a journal entry must be written prior to some content entry, determining that a large amount of high priority data is stored in a queue, and/or determining that a data slice in a queue must be written by a certain deadline. Once the switch is performed, the storage unit can write the new data in the cache, and flush the cache of a queue destined for the new zone.

In various embodiments, a processing system a storage unit of a DSN includes at least one processor and a memory that stores operational instructions, that when executed by the at least one processor cause the processing system to select a first one of a plurality of storage zones of a memory device of the storage unit based on zone allocation parameters. The first one of the plurality of storage zones is designated as open for writes. A first data slice is received via a network for storage. The first data slice is written sequentially at a memory location of the first one of the plurality of storage zones based on determining that the first one of the plurality of storage zones is designated as open for writes. A pointer corresponding to the first data slice that indicates the first one of the plurality of storage zones and the memory location is generated. A first read request is received via the network from a requesting entity that indicates the first data slice. The first data slice is retrieved from the memory device based on the pointer, and is transmitted to the requesting entity.

Figure 10:
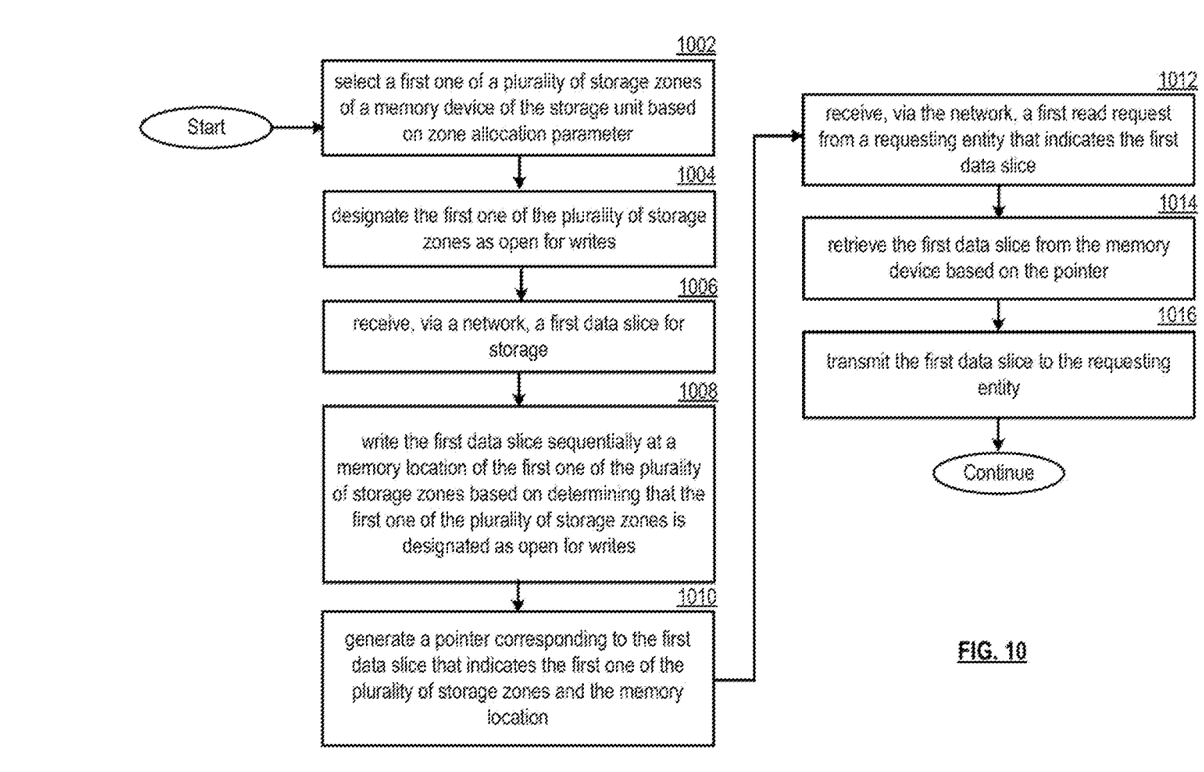
FIG. 10 is a logic diagram of an example of a method of storing sequentially in zones in accordance with the present invention.

FIG. 10 is a flowchart illustrating an example of storing data sequentially in zones. In particular, a method is presented for use in association with one or more functions and features described in conjunction with FIGS. 1-9, for execution by a storage unit includes a processor or via another processing system of a dispersed storage network that includes at least one processor and memory that stores instruction that configure the processor or processors to perform the steps described below. Step 1002 includes selecting a first one of a plurality of storage zones of a memory device of the storage unit based on zone allocation parameters. Step 1004 includes designating the first one of the plurality of storage zones as open for writes. Step 1006 includes receiving, via a network, a first data slice for storage. Step 1008 includes writing the first data slice sequentially at a memory location of the first one of the plurality of storage zones based on determining that the first one of the plurality of storage zones is designated as open for writes. Step 1010 includes generating a pointer corresponding to the first data slice that indicates the first one of the plurality of storage zones and the memory location. Step 1012 includes receiving, via the network, a first read request from a requesting entity that indicates the first data slice. Step 1014 includes retrieving the first data slice from the memory device based on the pointer. Step 1016 includes transmitting the first data slice to the requesting entity.

In various embodiments, the first data slice is written sequentially based on a small computer system interface protocol. In various embodiments, the first data slice is written sequentially based on an append point, and the append point is updated after the first data slice is written based on a length of the first data slice.

In various embodiments, a zone reallocation requirement is determined at a time after the first data slice is written. A second one of the plurality of storage zones that is designated as closed for writes is selected based on the zone reallocation requirement, and the second one of the plurality of storage zones is then designated as open for writes. A second data slice is received via the network for storage. The second data slice is written sequentially at a memory location of the second one of the plurality of storage zones based on determining that the second one of the plurality of storage zones is designated as open for writes.

In various embodiments, exactly one storage zone is selected and designated as open for writes based on the zone allocation parameters, where the exactly one storage zone is the first one of the plurality of storage zones. All remaining storage zones of the plurality of storage zones that are not the exactly one storage zone are designated as closed for writes. In various embodiments, a subset of storage zones is selected from the plurality of storage zones based on the zone allocation parameters. A size of the subset of storage zones is selected based on the zone allocation parameters, and the subset of storage zones includes the first one of the plurality of storage zones. The subset of storage zones is designated as open for writes. All storage zones in the plurality of storage zones that are not included in the subset of storage zones are designated as closed for writes.

In various embodiments, a subset of data slices from a plurality of data slices stored on the memory device that compare favorably to a read frequency threshold is identified. The subset of data slices is stored in a volatile memory of the storage unit, where reading the subset of data slices from the volatile memory is faster than reading the subset of data slices from the memory device. a second read request that indicates a second data slice is received via the network. The storage unit determines that the second data slice is stored in the volatile memory, and retrieves the second data slice from the volatile memory for transmission to the requesting entity via the network.

In various embodiments, a plurality of data slice write requests are received via the network, where the plurality of data slice write requests include a plurality of data slices. The plurality of data slices in a cache of the storage unit. The cache is flushed in response to a determining a cache flush requirement by generating a data object that includes the plurality of data slices, by writing the data object sequentially to the to the first one of the plurality of storage zones in response to determining the first one of the plurality of storage zones is designated as open for writes, and by removing the plurality of data slices from the cache.

In various embodiments, a subset of the plurality of storage zones that does not include the first one of the plurality of storage zones are designated as closed for writes. A plurality of data slice write requests are received via the network, where the plurality of data slice write requests includes a plurality of data slices. The plurality of data slices are stored in a cache of the storage unit, where storing the data slices includes assigning each of the plurality of data slices to one of a plurality of queues in the cache, and where each one of the plurality of queues corresponds to a storage zone in the subset of the plurality of storage zones designated as closed for writing. A zone reallocation requirement is determined after the plurality of data slices are stored in the cache. A second one of the plurality of storage zones is selected based on the zone reallocation requirement, the second one of the plurality of storage zones is included in the subset. The second one of the plurality of storage zones is designated as open for writes. A first one of the plurality of queues that corresponds to the second one of the plurality of storage zones is flushed from the cache, where the flushing includes writing the plurality of data slices in the first one of the plurality of queues sequentially to the second one of the plurality of storage zones in response to determining the second one of the plurality of storage zones is designated as open for writes and further includes deleting the first one of the plurality of queues from the cache.

In various embodiments, the zone reallocation requirement is based on a capacity of the cache comparing unfavorably to a cache capacity requirement. In various embodiments, the second one of the plurality of storage zones is selected based on a queue priority ranking corresponding to the plurality of queues, and the second one of the plurality of storage zones corresponds to a highest priority ranking of the queue priority ranking. In various embodiments, the queue priority ranking is based on a data dependency requirement, and the second one of the plurality of storage zones is assigned the highest priority ranking in response to determining that a second data slice in the second one of the plurality of storage zones must be written before a third data slice in a third one of the plurality of storage zones according to the data dependency requirement.

In various embodiments, a non-transitory computer readable storage medium includes at least one memory section that stores operational instructions that, when executed by a processing system of a dispersed storage network (DSN) that includes a processor and a memory, causes the processing system to select a first one of a plurality of storage zones of a memory device based on zone allocation parameters. The first one of the plurality of storage zones is designated as open for writes. A first data slice is received via a network for storage. The first data slice is written sequentially at a memory location of the first one of the plurality of storage zones based on determining that the first one of the plurality of storage zones is designated as open for writes. A pointer corresponding to the first data slice that indicates the first one of the plurality of storage zones and the memory location is generated. A first read request is received via the network from a requesting entity that indicates the first data slice. The first data slice is retrieved from the memory device based on the pointer, and is transmitted to the requesting entity.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations

What is claimed is:

1. A method for execution by a storage unit of a dispersed storage network (DSN) that includes a processor, the method comprising:
   determining zone allocation parameters;
   minimizing a frequency of switching between a plurality of storage zones of a memory device of the storage unit by caching incoming writes of data into the storage unit;
   selecting a first one of the plurality of storage zones of the memory device of the storage unit to be open for the writes based on the zone allocation parameters;
   selecting a second one of the plurality of storage zones of the memory device of the storage unit to be closed for the writes based on the zone allocation parameters;
   designating the first one of the plurality of storage zones as open for the writes in response to selecting the first one of the plurality of storage zones to be open for the writes;
   designating the second one of the plurality of storage zones as closed for the writes in response to selecting the second one of the plurality of storage zones to be closed for the writes;
   receiving, via a network, a first data slice for storage;
   creating a vault within the DSN and establishing dispersed storage error encoding parameters for the vault;
   tracking a number of times a user accesses the vault in generating per-access billing information; and
   tracking an amount of the data retrieved by a user device in generating per-data-amount billing information.

2. The method of claim 1, further comprising writing the first data slice sequentially at a memory location of the first one of the plurality of storage zones based on a small computer system interface protocol.

3. The method of claim 1, further comprising writing the first data slice sequentially at a memory location of the first one of the plurality of storage zones based on an append point; and updating the append point, after the first data slice is written, based on a length of the first data slice.

4. The method of claim 1, wherein exactly one storage zone is selected and designated as open for the writes based on the zone allocation parameters, wherein the exactly one storage zone is the first one of the plurality of storage zones, and wherein the method further comprises:
   designating all remaining storage zones of the plurality of storage zones that are not the exactly one storage zone as closed for the writes.

5. The method of claim 1, further comprising:
   selecting a subset of storage zones from the plurality of storage zones based on the zone allocation parameters, wherein a size of the subset of storage zones is selected based on the zone allocation parameters, and wherein the subset of storage zones includes the first one of the plurality of storage zones;

designating the subset of storage zones as open for the writes; and designating all storage zones in the plurality of storage zones that are not included in the subset of storage zones as closed for the writes.

6. The method of claim 1, further comprising:

determining a zone reallocation requirement at a time after the first data slice is written;

selecting a second one of the plurality of storage zones that is designated as closed for the writes based on the zone reallocation requirement;

designating the second one of the plurality of storage zones as open for the writes;

receiving, via the network, a second data slice for storage; and writing the second data slice sequentially at a memory location of the second one of the plurality of storage zones based on determining that the second one of the plurality of storage zones is designated as open for the writes.

7. The method of claim 1, further comprising:

identifying a subset of data slices from a plurality of data slices stored on the memory device that compare favorably to a read frequency threshold;

storing the subset of data slices in a volatile memory of the storage unit, wherein reading the subset of data slices from the volatile memory is faster than reading the subset of data slices from the memory device;

receiving, via the network, a second read request that indicates a second data slice;

determining that the second data slice is stored in the volatile memory; and retrieving the second data slice from the volatile memory for transmission to a requesting entity via the network.

8. The method of claim 1, further comprising:

receiving, via the network, a plurality of data slice write requests, wherein the plurality of data slice write requests includes a plurality of data slices;

storing the plurality of data slices in a cache of the storage unit; and flushing the cache in response to a determining a cache flush requirement by generating a data object that includes the plurality of data slices, by writing the data object sequentially to the to the first one of the plurality of storage zones in response to determining the first one of the plurality of storage zones is designated as open for the writes, and by removing the plurality of data slices from the cache.

9. The method of claim 1, further comprising:

designating a subset of the plurality of storage zones that does not include the first one of the plurality of storage zones as closed for the writes;

receiving, via the network, a plurality of data slice write requests, wherein the plurality of data slice write requests includes a plurality of data slices;

storing the plurality of data slices in a cache of the storage unit by assigning each of the plurality of data slices to one of a plurality of queues in the cache, wherein each one of the plurality of queues corresponds to a storage zone in the subset of the plurality of storage zones designated as closed for the writes;

determining a zone reallocation requirement after the plurality of data slices are stored in the cache;

selecting a second one of the plurality of storage zones based on the zone reallocation requirement, wherein the second one of the plurality of storage zones is included in the subset;

designating the second one of the plurality of storage zones as open for the writes; and flushing a first one of the plurality of queues that corresponds to the second one of the plurality of storage zones from the cache by writing the plurality of data slices in the first one of the plurality of queues sequentially to the second one of the plurality of storage zones in response to determining the second one of the plurality of storage zones is designated as open for the writes, and by deleting the first one of the plurality of queues from the cache.

10. The method of claim 9, wherein the zone reallocation requirement is based on a capacity of the cache comparing to a cache capacity requirement.

11. The method of claim 9, wherein the second one of the plurality of storage zones is selected based on a queue priority ranking corresponding to the plurality of queues, and wherein the second one of the plurality of storage zones corresponds to a highest priority ranking of the queue priority ranking.

12. The method of claim 11, wherein the queue priority ranking is based on a data dependency requirement, wherein the second one of the plurality of storage zones is assigned the highest priority ranking in response to determining that a second data slice in the second one of the plurality of storage zones must be written before a third data slice in a third one of the plurality of storage zones according to the data dependency requirement, and wherein the vault is a virtual memory block associated with a portion of an overall namespace of the DSN.

13. A processing system of a storage unit in a dispersed storage network (DSN) comprises:

at least one processor;

a memory that stores operational instructions, that when executed by the at least one processor cause the processing system to:

determine zone allocation parameters;

minimize a frequency of switching between a plurality of storage zones of a memory device of the storage unit by caching incoming reads and writes of data into the storage unit;

select a first one of the plurality of storage zones of the memory device of the storage unit to be open for the writes based on the zone allocation parameters;

select a second one of the plurality of storage zones of the memory device of the storage unit to be closed for the writes based on the zone allocation parameters;

designate the first one of the plurality of storage zones as open for the writes in response to selecting the first one of the plurality of storage zones to be open for the writes;

designate the second one of the plurality of storage zones as closed for the writes in response to selecting the second one of the plurality of storage zones to be closed for the writes;

receive, via a network, a first data slice for storage;

create a vault within the DSN and establish dispersed storage error encoding parameters for the vault;

track a number of times a user accesses the vault in generating per-access billing information; and track an amount of the data retrieved by a user device in generating per-data-amount billing information.

14. The processing system of claim 13, wherein the operational instructions, when executed by the at least one processor, further cause the processing system to write the first data slice sequentially at a memory location of the first one of the plurality of storage zones based on a small computer system interface protocol.

15. The processing system of claim 13, wherein the operational instructions, when executed by the at least one processor, further cause the processing system to write the first data slice sequentially at a memory location of the first one of the plurality of storage zones based on an append point, and updating the append point, after the first data slice is written, based on a length of the first data slice.

16. The processing system of claim 13, wherein the operational instructions, when executed by the at least one processor, further cause the processing system to:
   determine a zone reallocation requirement at a time after the first data slice is written;
   select a second one of the plurality of storage zones that is designated as closed for the writes based on the zone reallocation requirement;
   designate the second one of the plurality of storage zones as open for the writes;
   receive, via the network, a second data slice for storage; and
   write the second data slice sequentially at a memory location of the second one of the plurality of storage zones based on determining that the second one of the plurality of storage zones is designated as open for the writes.

17. The processing system of claim 13, wherein the operational instructions, when executed by the at least one processor, further cause the processing system to:
   identify a subset of data slices from a plurality of data slices stored on the memory device that compare favorably to a read frequency threshold;
   store the subset of data slices in a volatile memory of the storage unit, wherein reading the subset of data slices from the volatile memory is faster than reading the subset of data slices from the memory device;
   receive, via the network, a second read request that indicates a second data slice;
   determine that the second data slice is stored in the volatile memory; and
   retrieve the second data slice from the volatile memory for transmission to a requesting entity via the network.

18. The processing system of claim 13, wherein the operational instructions, when executed by the at least one processor, further cause the processing system to:
   receive, via the network, a plurality of data slice write requests, wherein the plurality of data slice write requests include a plurality of data slices;
   store the plurality of data slices in a cache of the storage unit; and
   flush the cache in response to a determining a cache flush requirement by generating a data object that includes the plurality of data slices, by writing the data object sequentially to the to the first one of the plurality of storage zones in response to determining the first one of the plurality of storage zones is designated as open for the writes, and by removing the plurality of data slices from the cache.

19. The processing system of claim 13, wherein the operational instructions, when executed by the at least one processor, further cause the processing system to:
   designate a subset of the plurality of storage zones that does not include the first one of the plurality of storage zones as closed for the writes;
   receive, via the network, a plurality of data slice write requests, wherein the plurality of data slice write requests includes a plurality of data slices;
   store the plurality of data slices in a cache of the storage unit by assigning each of the plurality of data slices to one of a plurality of queues in the cache, wherein each one of the plurality of queues corresponds to a storage zone in the subset of the plurality of storage zones designated as closed for the writes;
   determine a zone reallocation requirement after the plurality of data slices are stored in the cache;
   select a second one of the plurality of storage zones based on the zone reallocation requirement, wherein the second one of the plurality of storage zones is included in the subset;
   designate the second one of the plurality of storage zones as open for the writes; and
   flush a first one of the plurality of queues that corresponds to the second one of the plurality of storage zones from the cache by writing the plurality of data slices in the first one of the plurality of queues sequentially to the second one of the plurality of storage zones in response to determining the second one of the plurality of storage zones is designated as open for the writes, and by deleting the first one of the plurality of queues from the cache.

20. A non-transitory computer readable storage medium comprises:
   at least one memory section that stores operational instructions that, when executed by a processing system of a dispersed storage network (DSN) that includes a processor and a memory, causes the processing system to:
   determine zone allocation parameters;
   minimize a frequency of switching between a plurality of storage zones of a memory device of a storage unit by caching incoming reads and writes of data into the storage unit;
   select a first one of the plurality of storage zones of the memory device of the storage unit to be open for the writes based on the zone allocation parameters;
   select a second one of the plurality of storage zones of the memory device of the storage unit to be closed for the writes based on the zone allocation parameters;
   designate the first one of the plurality of storage zones as open for the writes in response to selecting the first one of the plurality of storage zones to be open for the writes;
   designate the second one of the plurality of storage zones as closed for the writes in response to selecting the second one of the plurality of storage zones to be closed for the writes;
   receive, via a network, a first data slice for storage;
   track a number of times a user accesses a vault in generating per-access billing information, wherein the vault comprises a virtual memory block associated with a portion of an overall namespace of the DSN; and
   track an amount of the data retrieved by a user device in generating per-data-amount billing information.

* * * * *